United States Patent
Wang et al.

(10) Patent No.: US 11,955,881 B2
(45) Date of Patent: Apr. 9, 2024

(54) SECONDARY-SIDE PROTECTION AND SENSE CIRCUIT FOR POWER CONVERTER

(71) Applicant: MINMAX TECHNOLOGY CO., LTD., Tainan (TW)

(72) Inventors: Ching-Hung Wang, Tainan (TW); Yu-Hsuan Chen, Tainan (TW)

(73) Assignee: MINMAX TECHNOLOGY CO., LTD, Tainan (TW)

( * ) Notice: Subject to any disclaimer, the term of this patent is extended or adjusted under 35 U.S.C. 154(b) by 267 days.

(21) Appl. No.: 17/691,440

(22) Filed: Mar. 10, 2022

(65) Prior Publication Data

US 2023/0291302 A1   Sep. 14, 2023

(51) Int. Cl.
*H02M 3/335* (2006.01)
*H02M 1/00* (2006.01)
*H02M 1/32* (2007.01)

(52) U.S. Cl.
CPC ........... *H02M 1/32* (2013.01); *H02M 1/0003* (2021.05); *H02M 3/33507* (2013.01)

(58) Field of Classification Search
CPC .. H02M 1/0009; H02M 1/0025; H02M 3/156; H02M 3/33507
See application file for complete search history.

(56) References Cited

U.S. PATENT DOCUMENTS

| | | | |
|---|---|---|---|
| 5,285,367 A | 2/1994 | Keller | |
| 5,917,312 A * | 6/1999 | Brkovic | H02M 3/156 323/285 |
| 8,814,327 B2 | 8/2014 | Takayanagi et al. | |
| 8,976,543 B1 * | 3/2015 | Zheng | H02M 3/33573 363/17 |
| 2009/0323374 A1 | 12/2009 | Park et al. | |
| 2020/0076299 A1 * | 3/2020 | Xue | H02M 3/158 |
| 2020/0412264 A1 | 12/2020 | Khamesra et al. | |

FOREIGN PATENT DOCUMENTS

| | | |
|---|---|---|
| CN | 206099799 U | 4/2017 |
| JP | 2000023457 A | 1/2000 |
| JP | 2006333569 A | 12/2006 |
| JP | 2010130866 A | 6/2010 |
| TW | 483224 B | 4/2002 |
| WO | WO01/61832 A2 | 8/2001 |
| WO | WO-2019172643 A1 * | 9/2019 ............. H02M 1/08 |

\* cited by examiner

*Primary Examiner* — Gary L Laxton
(74) *Attorney, Agent, or Firm* — MUNCY, GEISSLER, OLDS & LOWE, PC (57) ABSTRACT

A secondary-side protection and sense circuit for a power converter has a sensing component, an adder amplifying circuit, an electronic switch, and a charge/discharge circuit. The sensing component is connected to an output connecting terminal of the power converter. The adder amplifying circuit has an operational amplifier, a first resistor, and a second resistor. The operational amplifier has an input terminal connected to the sensing component, an output terminal connected to a primary-side control component, and a power terminal. The first resistor and the second resistor are connected in series and between the input terminal and the power terminal of the operational amplifier. The electronic switch is connected between a ground terminal and a connection node between the first resistor and the second resistor. The charge/discharge circuit is connected to the electronic switch and the power terminal of the operational amplifier.

11 Claims, 5 Drawing Sheets

SECONDARY-SIDE PROTECTION AND SENSE CIRCUIT FOR POWER CONVERTER

BACKGROUND OF THE INVENTION

1. Field of the Invention

The present invention generally relates to a protection and sense circuit, and more particularly to a secondary-side protection and sense circuit for a power converter.

2. Description of Related Art

Figure 4:
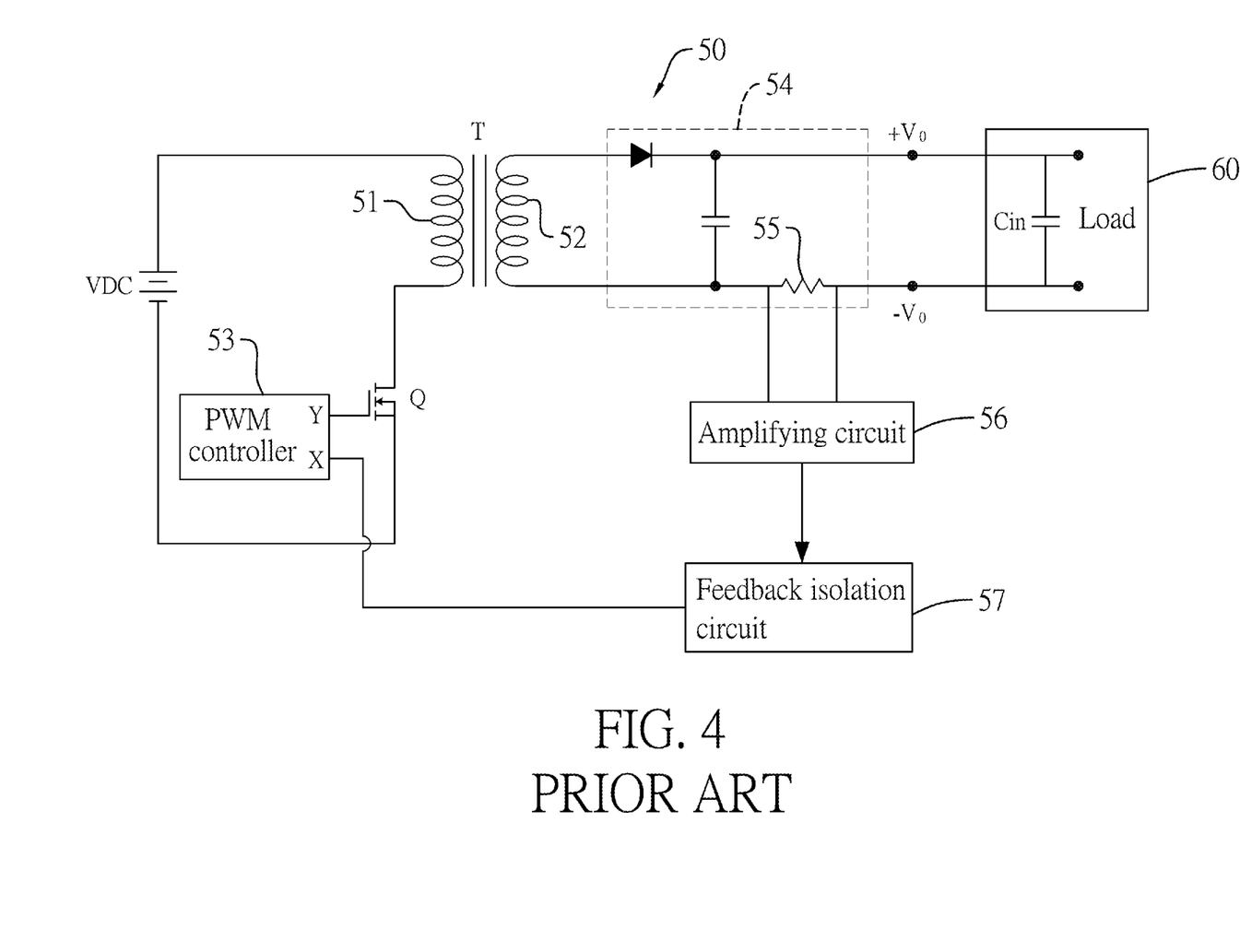
FIG. 4 is a circuit block diagram of a power converter in connection with an amplifying circuit of the prior art.

A basic configuration of a conventional power converter is shown in FIG. 4. The conventional power converter 50 basically comprises a transformer T. A primary-side winding 51 of the transformer T is connected to a driving switch Q in series. A gate of the driving switch Q may be connected to a signal output pin Y of a PWM (pulse width modulation) controller 53. Besides, the PWM controller 53 has a trigger pin X for triggering a protected mode. The primary-side winding 51 of the transformer T is connected to a power input terminal of the power converter 50 to receive a DC (direct current) input power VDC. Two terminals of a secondary-side winding 52 of the transformer T may be respectively connected to a positive output terminal (+Vo) and a negative output terminal (−Vo) of the power converter 50 via a secondary-side circuit 54. The positive output terminal (+Vo) and the negative output terminal (−Vo) are connected to a load 60. The negative output terminal (−Vo) is connected to a sensing resistor 55 in series. The sensing resistor 55 is connected to an amplifying circuit 56. The amplifying circuit 56 may be an inverting amplifying circuit or a non-inverting amplifying circuit and basically consist of an operational amplifier (OPA). The amplifying circuit 56 is connected to the trigger pin X of the PWM controller 53 via a feedback isolation circuit 57. The feedback isolation circuit 57 may consist of a photocoupler as an example.

The working principle of the power converter 50 is described as follows. The PWM controller 53 outputs a driving signal to the driving switch Q. The driving switch Q is activated according to the driving signal. The DC input power VDC will be converted by the transformer T and the secondary-side circuit 54 to a DC output power, and the DC output power is provided on the positive output terminal (+Vo) and the negative output terminal (−Vo) for the load 60. Hence, when a current passes through the sensing resistor 55, a voltage drop (hereinafter referred to as a sensing voltage) may be sensed on two terminals of the sensing resistor 55. The sensing voltage may reflect the current provided by the power converter 50 to the load 60. The sensing voltage will be amplified by the amplifying circuit 56 and fed backward to the trigger pin X of the PWM controller 53 via the feedback isolation circuit 57. When the voltage on the trigger pin X is higher than or equal to a protected-mode threshold, which means an abnormal condition occurs in the load 60 in general, the PWM controller 53 enters a protected mode. Under the protected mode, the PWM controller 53 stops outputting the driving signal to the driving switch Q to deactivate the driving switch Q. As a result, the DC output power is stopped from providing for the load 20 to achieve the protection effect.

Figure 5:
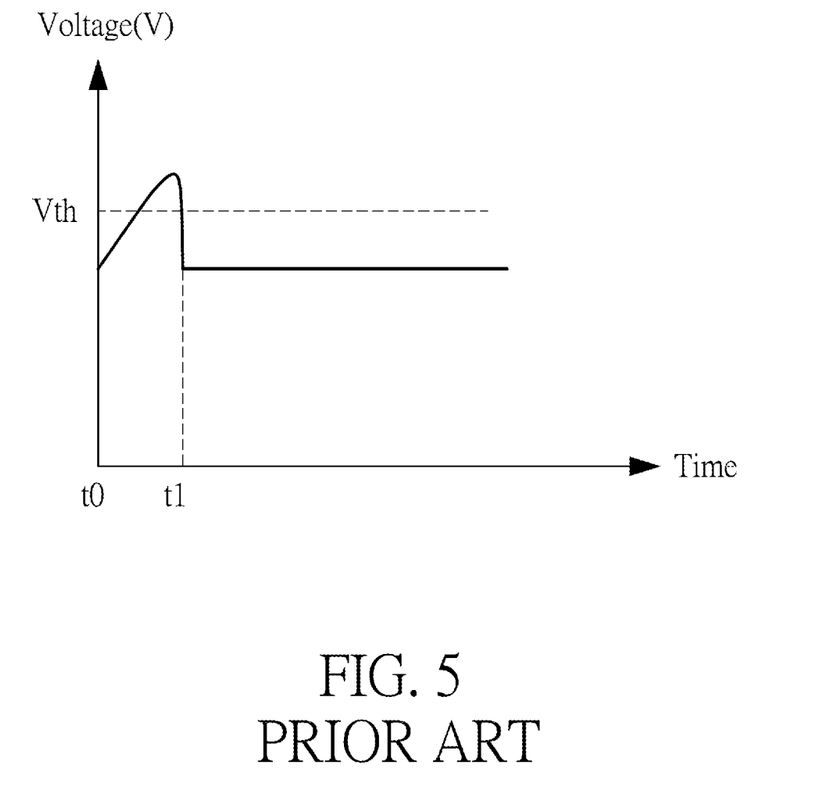
FIG. 5 is a waveform diagram of a voltage of the conventional amplifying circuit fed backward to a primary-side control component.

When the load 60 connected to the power converter 50 is a capacitive load, in other words, an input capacitor Cin is connected to the input terminal of the load 60, a surge current is generated and charges the input capacitor Cin of the load 60 at a turning-on moment of the power converter 50. The output voltage of the amplifying circuit 56, as shown in FIG. 5, according to the sensing voltage may reflect the surge current. The surge current occurs during t0 to t1. The power converter 50 enters a steady state after t1.

However, during t0 to t1, the output voltage of the amplifying circuit 56 may rise to a voltage value Vth. When the voltage value Vth is fed backward to the trigger pin X of the PWM controller 53 via the feedback isolation circuit 57, the PWM controller 53 will be triggered to enter the protected mode. In other words, as soon as the power converter 50 is turned on, the power converter 50 may directly enter the protected mode, and then fails to provide the DC output power to the load 60.

SUMMARY OF THE INVENTION

An objective of the present invention is to provide a secondary-side protection and sense circuit for a power converter to overcome the defect that the convention power converter fails to provide the DC output power to the load because the power converter directly enters the protected mode as soon as the power converter is turned on.

The secondary-side protection and sense circuit of the present invention comprises a sensing component, an adder amplifying circuit, an electronic switch, and a charge/discharge circuit. The sensing component is connected to an output connecting terminal of the power converter. The adder amplifying circuit comprises an operational amplifier, a first resistor, and a second resistor. The operational amplifier comprises an input terminal connected to the sensing component, an output terminal connected to a primary-side control component of the power converter, and a power terminal. The first resistor and the second resistor are connected in series and between the input terminal and the power terminal of the operational amplifier. A connection node is defined between the first resistor and the second resistor. The electronic switch is connected between a ground terminal and the connection node and comprises a control terminal. The charge/discharge circuit is connected to the control terminal of the electronic switch and the power terminal of the operational amplifier.

In the present invention, based on the circuit configuration of the adder amplifying circuit, the voltage polarity sensed from the sensing component is inverse to the voltage polarity on the power terminal of the operational amplifier. Although a surge current occurs at the turning-on moment of the power converter, the voltage on the output terminal of the operational amplifier is reduced as a whole, such that the voltage on a trigger pin of the primary-side control component is still lower than a protected-mode threshold. Therefore, the surge current will not cause the primary-side control component to enter the protected mode. The above-mentioned defect is overcome. Besides, in a steady state, the energy stored in the charge/discharge circuit is sufficient to turn on the electronic switch. When the electronic switch is turned on, the connection node between the first resistor and the second resistor will have a low voltage level or be grounded, such that the adder amplifying circuit is configured to be a general amplifier circuit. Then, regular protection and monitoring will be implemented according to a steady-state current passing through the sensing component in the present invention.

On the other hand, the present invention includes simple electronic components such as the operational amplifier, resistors, capacitors, electronic switches, and so on, rather than a digital control circuit that includes microcontrollers. Hence, the cost of the present invention will be significantly reduced.

DETAILED DESCRIPTION OF PREFERRED EMBODIMENT(S)

The secondary-side protection and sense circuit is applied to a power converter. It is to be noted that the circuit configuration and the working principle of the power converter are not the focus of the present invention, so are introduced briefly as follows.

Figure 1:
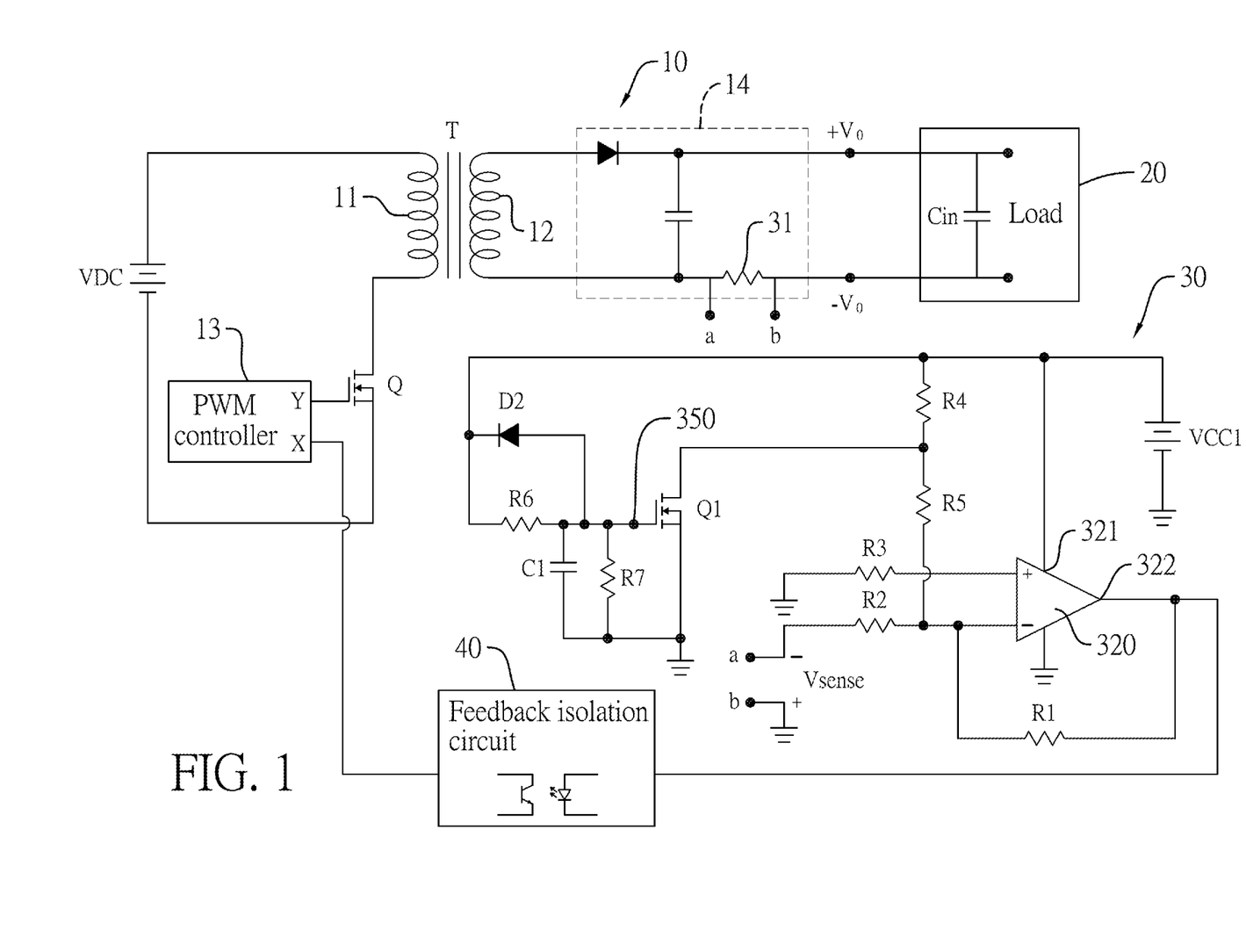
FIG. 1 is a circuit block diagram of an embodiment of the secondary-side protection and sense circuit of the present invention connected to a power converter.

With reference to FIG. 1, the power converter 10 may be a switching power converter operating within a wide input voltage range, or a step-up boost converter, such that the present invention can be used to a wide range of applications. For example, the circuit configuration of the power converter 10 basically comprises a transformer T, a driving switch Q, a PWM (pulse width modulation) controller 13, and a secondary-side circuit 14. The PWM controller 13 comprises a signal output pin Y and a trigger pin X for triggering a protected mode. A primary-side winding 11 of the transformer T is connected to the driving switch Q in series. The driving switch Q may be a MOSFET (Metal-Oxide-Semiconductor Field-Effect Transistor) as an example, wherein a gate of the driving transistor Q may be connected to the signal output pin Y of the PWM controller 13. Besides, the primary-side winding 11 of the transformer T is connected to a power input terminal of the power converter 10 to receive a DC (direct current) input power VDC. Two terminals of a secondary-side winding 12 of the transformer T may be connected to output connecting terminals of the power converter 10 via the secondary-side circuit 14. The output connecting terminals of the power converter 10 may comprise a positive output terminal (+Vo) and a negative output terminal (−Vo) that are for being connected to a load 20. The working principle of the power converter 10 may be referred to the prior art and is not repeatedly introduced herein. In brief, when a voltage on the trigger pin X of the PWM controller 13 is higher than or equal to a protected-mode threshold, the PWM controller 13 enters a protected mode. Under the protected mode, the PWM controller 13 stops outputting a driving signal to the driving switch Q to deactivate the driving switch Q. As a result, a DC output power is stopped from providing for the load 20 to achieve the protection effect.

Figure 2:
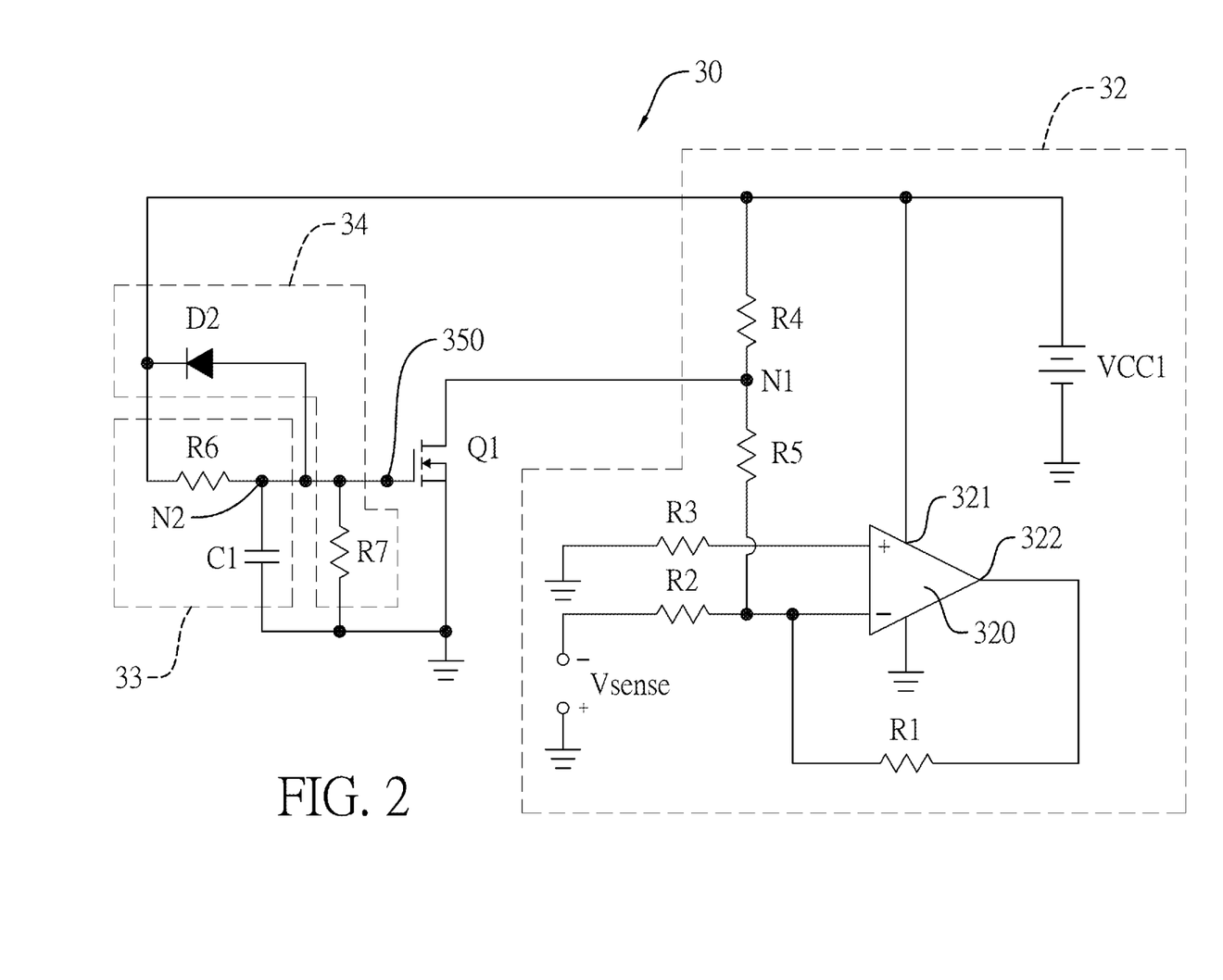
FIG. 2 is a circuit block diagram of an embodiment of the secondary-side protection and sense circuit of the present invention.

With reference to FIG. 1 and FIG. 2, the secondary-side protection and sense circuit 30 of the present invention comprises a sensing component 31, an adder amplifying circuit 32, an electronic switch Q1, and a charge/discharge circuit 33, or further comprises an auxiliary discharge circuit 34. The secondary-side protection and sense circuit 30 may be connected to the trigger pin X of the PWM controller 13 via a feedback isolation circuit 40, for the purpose to control the PWM controller 13 to enter the protected mode at a proper moment. That will be described in detail as follows.

The sensing component 31 is connected to one of the output connecting terminals of the power converter 10. In the present invention, the sensing component 31 is connected between the negative output terminal (−Vo) and the secondary-side winding 12 of the transformer T in series. The sensing component 31 may be a resistor, and preferably have lower resistance to minimize its power consumption.

The adder amplifying circuit 32 comprises an operational amplifier (OPA) 320 and resistors connected to the operational amplifier 320. The operational amplifier 320 comprises an input terminal, a power terminal 321, and an output terminal 322. The input terminal of the operational amplifier 320 is connected to the sensing component 31. The output terminal of the operational amplifier 320 is connected to a primary-side control component of the power converter 10. In the present invention, the PWM controller 13 is deemed as the primary-side control component. The output terminal 322 of the operational amplifier 320 is connected to the trigger pin X of the PWM controller 13 via the feedback isolation circuit 40. The feedback isolation circuit 40 may include a photocoupler as an example.

In general, the operational amplifier 320 and the resistors of the adder amplifying circuit 32 may be connected to form different configurations, such that a configuration of the adder amplifying circuit 32 may be an inverting adder circuit configuration or a non-inverting adder circuit configuration. The adder amplifying circuit 32 of the present invention is implemented as the inverting adder circuit configuration as an example. The operational amplifier 320 comprises an inverting input terminal (−) and a non-inverting input terminal (+). As mentioned above, the input terminal of the operational amplifier 320 connected to the sensing component 31 is the inverting input terminal (−), such that the operational amplifier 320 can receive a sensed voltage $V_{sense}$, such as a voltage rise, on the sensing component 31. The sensed voltage $V_{sense}$ of the sensing component 31 may reflect the output current of the power converter 10.

As shown in FIG. 2, the resistors included in the adder amplifying circuit 32 comprise a first resistor R4 and a second resistor R5. The first resistor R4 and the second resistor R5 are connected in series and between the inverting input terminal (−) and the power terminal 321 of the operational amplifier 320. In other words, a terminal of the first resistor R4 is connected to the power terminal 321 of the operational amplifier 320. The other terminal of the first resistor R4 is connected to a terminal of the second resistor R5. The other terminal of the second resistor R5 is connected to the inverting input terminal (−) of the operational amplifier 320.

A connection node N1 is defined between the first resistor R4 and the second resistor R5. With reference to the embodiment of the inverting adder circuit configuration as shown in FIG. 2, the non-inverting input terminal (+) of the operational amplifier 320 is grounded via a resistor R3. A resistor R1 is connected between the output terminal 322 and the inverting input terminal (−) of the operational amplifier 320. The inverting input terminal (−) of the operational amplifier 320 is connected to the sensing component 31 via a resistor R2. The power terminal 321 of the operational amplifier 320 receives a working voltage VCC1. For example, the power terminal 321 of the operational amplifier 320 may be connected to a secondary-side auxiliary winding (not shown in the figure) to receive the working voltage VCC1 from the secondary-side auxiliary winding.

The electronic switch Q1 is connected to a ground terminal and to the power terminal 321 of the operational amplifier 320 via one of the resistors of the adder amplifying circuit 32. For example, the electronic switch Q1 may be connected to the power terminal 321 of the operational amplifier 320 via the first resistor R4. When the electronic switch Q1 is turned on, the connection node N1 will have a low voltage level or be grounded. On the contrary, when the electronic switch Q1 is turned off, the first resistor R4 and the second resistor R5 are in a state of series connection. The power terminal 321 of the operational amplifier 320 has a high voltage level. The electronic switch Q1 comprises a control terminal 350. The electronic switch Q1 will be turned on or turned off according to the voltage on its control terminal 350. For example, the electronic switch Q1 may be a transistor, such as an N-type MOSFET, wherein its drain is connected to the connection node N1 between the first resistor R4 and the second resistor R5, its source is connected to the ground terminal, and its gate is deemed as the control terminal 350.

The charge/discharge circuit 33 is connected to the control terminal 350 of the electronic switch Q1 and the power terminal 321 of the operational amplifier 321. As implied in the name, the charge/discharge circuit 33 should have an energy storage component. The charge/discharge circuit 33 has a function that when the power terminal 321 of the operational amplifier 320 receives the working voltage VCC1, the energy storage component of the charge/discharge circuit 33 is charged by the working voltage VCC1 at the same time, such that the voltage provided by the energy storage component on the control terminal 350 of the electronic switch Q1 will be gradually increased to be sufficient to turn on the electronic switch Q1. In the present invention, the charge/discharge circuit 33 comprises a resistor R6 and a capacitor C1. The resistor R6 of the charge/discharge circuit 33 is connected between the control terminal 350 of the electronic switch Q1 and the power terminal 321 of the operational amplifier 320. The capacitor C1 is the above-mentioned energy storage component. The capacitor C1 is connected between the control terminal 350 of the electronic switch Q1 and the ground terminal. Hence, the resistor R6 and the capacitor C1 may construct a charge/discharge path. The working voltage VCC1 may charge the capacitor C1 via the resistor R6. A second connection node N2 is defined between the resistor R6 and the capacitor C1 of the charge/discharge circuit 33.

The whole circuit configuration of the secondary-side protection and sense circuit of the present invention applied to the power converter 10 is disclosed as above. The circuit operation referred to current waveform diagrams of the present invention is disclosed as follows.

With reference to FIG. 1, the load 20 connected to the power converter 10 is a capacitive load. In other words, an input capacitor Cin is connected to the input terminal of the load 20. At a turning-on moment of the power converter 10, a surge current is generated and charges the input capacitor Cin of the load 20. Meanwhile, the electronic switch Q1 is not turned on yet. The adder amplifying circuit 32 performs its adding function. Although the sensed voltage $V_{sense}$ will become higher when the surge current passes through the sensing component 31, the polarity of the sensed voltage $V_{sense}$ is inverse to the polarity of working voltage VCC1. As a result, the output voltage $V_{op}$ on the output terminal 321 of the operational amplifier 320 will be reduced based on the arrangement of the first capacitor R4 and the second capacitor R5. The output voltage $V_{op}$ of the operational amplifier 320 may be expressed as:

$$V_{op} = -R1\left(\frac{Vsense}{R2} + \frac{VCC1}{R4+R5}\right)$$

In the above equation, the sensed voltage $V_{sense}$ is a negative voltage, and the working voltage VCC1 is a positive voltage. In other words, when the surge current passes through the sensing component 31 to cause the sensed voltage $V_{sense}$ to become higher, the reduction magnitude of the output voltage $V_{op}$ may be expressed as follows after the processing of the operational amplifier 320.

$$\left(\frac{R1}{R4+R5}\right) \times VCC1$$

By doing so, the voltage on the trigger pin X of the PWM controller 13 is still lower than the protected-mode threshold according to the voltage outputted from the operational amplifier 320, such that the PWM controller 13 will not be triggered to enter the protected mode at the turning-on moment of the power converter 10.

When the power converter 10 operates in a steady state, a steady-state current passing through the sensing component 31 is lower than the surge current. At that time, the capacitor C1 of the charge/discharge circuit 33 is charged by the working voltage VCC1, and the voltage provided by the capacitor C1 will be sufficient to turn on the electronic switch Q1. When the electronic switch Q1 is turned on, the connection node N1 between the first resistor R4 and the second resistor R5 of the adder amplifying circuit 32 is grounded, such that the adder amplifying circuit 32 becomes a general inverting amplifier and does not perform its adding function. At that time, the operational amplifier 320 can only amplify the sensed voltage $V_{sense}$ when the steady-state current passes through the sensing component 31. As a result, when a short-circuit failure occurs in the load 20 and a short-circuit current passes through the sensing component 31, the sensed voltage $V_{sense}$ will be amplified directly by the short-circuit current passing through the sensing component 31. At that time, the output voltage $V_{op}$ is not that low. The voltage outputted from the operational amplifier 320 will cause the voltage on the trigger pin X of the PWM controller 13 to be higher than or equal to the protected-mode threshold, and further trigger the PWM controller 13 to enter the protected mode to provide a short-circuit protection function.

Figure 3:
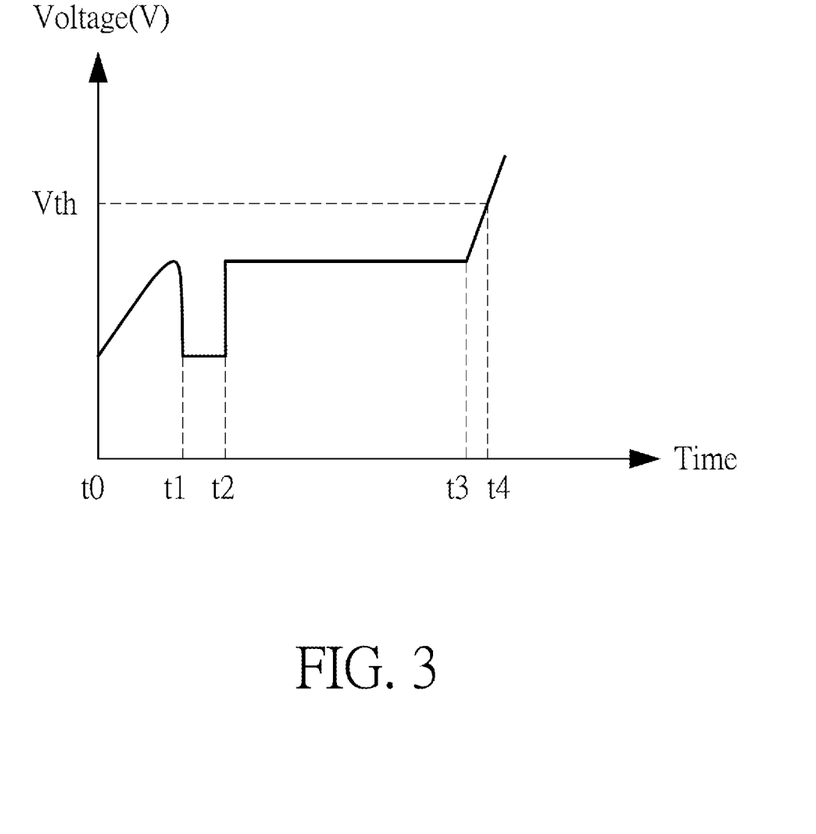
FIG. 3 is a waveform diagram of a voltage in the present invention fed backward to a primary-side control component.

In conclusion, the voltage waveform diagram on the output terminal 322 of the operational amplifier 320 is referred to FIG. 3. The power converter 10 is turned on at t0. Although the surge current occurs at the turning-on moment of the power converter 10 during t0 to t1, the adder amplifying circuit 32 performs its adding function. Compared with FIG. 5 mentioned in the prior art, FIG. 3 shows that the voltage on the output terminal 321 of the operational amplifier 320 of the present invention is reduced as a whole. As time goes on, the capacitor C1 of the charge/discharge circuit 33 is charged to be able to turn on the electronic switch Q1 at t2. Therefore, the current passing through the sensing component 31 after t2 is the steady-state current. The arrangement of the capacitance of the capacitor C1 and the resistance of the resistor R6 of the charge/discharge circuit 33 may determine the timing to turn on the electronic switch Q1, and namely determine the time length between t0 and t2. In addition, FIG. 3 shows a short-circuit current occurs at t3, such that the voltage on the output terminal 322 of the operational amplifier 320 rises to a voltage value Vth at t4. When the voltage value Vth is fed backward to the trigger pin X of the PWM controller 13 via the feedback isolation circuit 40, the PWM controller 13 will be triggered to enter the protected mode to provide the short-circuit protection function.

Besides, in consideration that the power converter 10 may be shut down and turned on suddenly when operating, due to an unstable status of the DC input power VDC in a moment, the secondary-side protection and sense circuit of the present invention comprises the auxiliary discharge circuit 34. The auxiliary discharge circuit 34 comprises a diode D2 and a resistor R7. The diode D2 has an anode and a cathode, wherein the anode is connected to the second connection node N2 between the resistor R6 and the capacitor C1 of the charge/discharge circuit 33, and the cathode is connected to the power terminal 321 of the operational amplifier 320. In other words, the diode D2 may be connected across the resistor R6 of the charge/discharge circuit 33. The resistor R7 of the auxiliary discharge circuit 34 is connected between the control terminal 350 of the electronic switch Q1 and the ground terminal.

When the power converter 10 is shut down, the capacitor C1 of the charge/discharge circuit 33 and a parasitic capacitance of the electronic switch Q1 can be discharged via a discharging path formed by the diode D2 and another discharging path formed by the resistor R7. The above-mentioned multiple discharging paths may expedite the discharge effect, such that the speed to turn off the electronic switch Q1 is accelerated, and the energy storage of the capacitor C1 is minimized. By doing so, at the moment that the power converter 10 is shut down and turned on suddenly, the electronic switch Q1 is definitely turned off. The adder amplifying circuit 32 can be reset to an initial state to perform its adding function. On the other hand, because the energy storage of the capacitor C1 is minimized, the time to charge the capacitor C1 to be able to turn on the electronic switch Q1 is maximized accordingly. There will be more sufficient time to limit the impact caused by the surge current.

What is claimed is:

1. A secondary-side protection and sense circuit for a power converter, comprising:
   a sensing component connected to an output connecting terminal of the power converter;
   an adder amplifying circuit comprising an operational amplifier, a first resistor, and a second resistor, wherein the operational amplifier comprises:
      an input terminal connected to the sensing component;
      an output terminal connected to a primary-side control component of the power converter; and
      a power terminal;
   the first resistor and the second resistor are connected in series and between the input terminal and the power terminal of the operational amplifier; and a connection node is defined between the first resistor and the second resistor;
   an electronic switch connected between a ground terminal and the connection node and comprising a control terminal; and
   a charge/discharge circuit connected to the control terminal of the electronic switch and the power terminal of the operational amplifier.

2. The secondary-side protection and sense circuit as claimed in claim 1, wherein the adder amplifying circuit is implemented as an inverting adder circuit configuration.

3. The secondary-side protection and sense circuit as claimed in claim 1, wherein a configuration of the adder amplifying circuit is a non-inverting adder circuit configuration.

4. The secondary-side protection and sense circuit as claimed in claim 2, wherein
   the input terminal of the operational amplifier connected to the sensing component is an inverting input terminal;
   the first resistor and the second resistor are connected in series and between the inverting input terminal and the power terminal of the operational amplifier.

5. The secondary-side protection and sense circuit as claimed in claim 4, wherein the electronic switch is an N-type MOSFET having:
   a drain connected to the connection node between the first resistor and the second resistor;
   a source connected to the ground terminal; and
   a gate as the control terminal.

6. The secondary-side protection and sense circuit as claimed in claim 2, wherein the charge/discharge circuit comprises:
   a resistor connected between the control terminal of the electronic switch and the power terminal of the operational amplifier; and
   a capacitor connected between the control terminal of the electronic switch and the ground terminal.

7. The secondary-side protection and sense circuit as claimed in claim 4, wherein the charge/discharge circuit comprises:
   a resistor connected between the control terminal of the electronic switch and the power terminal of the operational amplifier; and
   a capacitor connected between the control terminal of the electronic switch and the ground terminal.

8. The secondary-side protection and sense circuit as claimed in claim 5, wherein the charge/discharge circuit comprises:
   a resistor connected between the control terminal of the electronic switch and the power terminal of the operational amplifier; and
   a capacitor connected between the control terminal of the electronic switch and the ground terminal.

9. The secondary-side protection and sense circuit as claimed in claim 6, wherein
   the connection node between the first resistor and the second resistor is defined as a first connection node;
   a second connection node is defined between the resistor and the capacitor of the charge/discharge circuit;
   the secondary-side protection and sense circuit comprises an auxiliary discharge circuit comprising:
      a diode having an anode connected to the second connection node and a cathode connected to the power terminal of the operational amplifier; and
      a resistor connected between the control terminal of the electronic switch and the ground terminal.

10. The secondary-side protection and sense circuit as claimed in claim 7, wherein
    the connection node between the first resistor and the second resistor is defined as a first connection node;
    a second connection node is defined between the resistor and the capacitor of the charge/discharge circuit;

the secondary-side protection and sense circuit comprises
an auxiliary discharge circuit comprising:
a diode having an anode connected to the second connection node and a cathode connected to the power terminal of the operational amplifier; and
a resistor connected between the control terminal of the electronic switch and the ground terminal.

11. The secondary-side protection and sense circuit as claimed in claim 8, wherein
the connection node between the first resistor and the second resistor is defined as a first connection node;
a second connection node is defined between the resistor and the capacitor of the charge/discharge circuit;
the secondary-side protection and sense circuit comprises
an auxiliary discharge circuit comprising:
a diode having an anode connected to the second connection node and a cathode connected to the power terminal of the operational amplifier; and
a resistor connected between the control terminal of the electronic switch and the ground terminal.

* * * * *